(12) United States Patent
Eastman et al.

(10) Patent No.: US 7,912,986 B2
(45) Date of Patent: Mar. 22, 2011

(54) SECURE BLOCK READ AND WRITE PROTOCOL FOR REMOTELY STORED FILES

(75) Inventors: John M. Eastman, Katy, TX (US); Chad F. Jones, Hayward, CA (US); John Thomas White, Jr., Houston, TX (US)

(73) Assignee: Simdesk Technologies, Houston, TX (US)

( * ) Notice: Subject to any disclaimer, the term of this patent is extended or adjusted under 35 U.S.C. 154(b) by 277 days.

(21) Appl. No.: 12/036,765

(22) Filed: Feb. 25, 2008

(65) Prior Publication Data

US 2009/0216907 A1 Aug. 27, 2009

(51) Int. Cl.
*G06F 15/173* (2006.01)
*G06F 15/177* (2006.01)
*G06F 15/16* (2006.01)

(52) U.S. Cl. ........ 709/247; 709/231; 709/203; 713/165; 707/705

(58) Field of Classification Search ................ 709/247, 709/217–224, 203, 231, 232; 713/165; 707/705
See application file for complete search history.

(56) References Cited

U.S. PATENT DOCUMENTS

| | | | |
|---|---|---|---|
| 2006/0184652 A1* | 8/2006 | Teodosiu et al. | 709/221 |
| 2006/0212672 A1* | 9/2006 | Chandrasekaran et al. | 711/171 |
| 2007/0011469 A1* | 1/2007 | Allison et al. | 713/193 |
| 2007/0011749 A1* | 1/2007 | Allison et al. | 726/26 |
| 2007/0016771 A1* | 1/2007 | Allison et al. | 713/165 |
| 2007/0198463 A1* | 8/2007 | Sarakas | 707/1 |
| 2007/0266062 A1* | 11/2007 | Young | 707/204 |
| 2008/0040401 A1* | 2/2008 | Reinsch | 707/203 |

* cited by examiner

*Primary Examiner* — Haresh N Patel
(74) *Attorney, Agent, or Firm* — Wong, Cabello, Lutsch, Rutherford & Brucculeri, LLP

(57) ABSTRACT

A file transfer system including a client and a server capable of updating portions of the file stored on the server. The system is capable of uploading portions of a file before the file has been specified at the client side. The files are stored in raw at the client and the server, which preserves the block list mapping. The file transfer protocol is capable of compressing and encrypting transferred data. As a result, the partial file writes are possible while maintaining current bandwidth usage. The write request data structure is provided with additional features in the form of flags and fields to provide reliable transmission of partial file data.

5 Claims, 2 Drawing Sheets

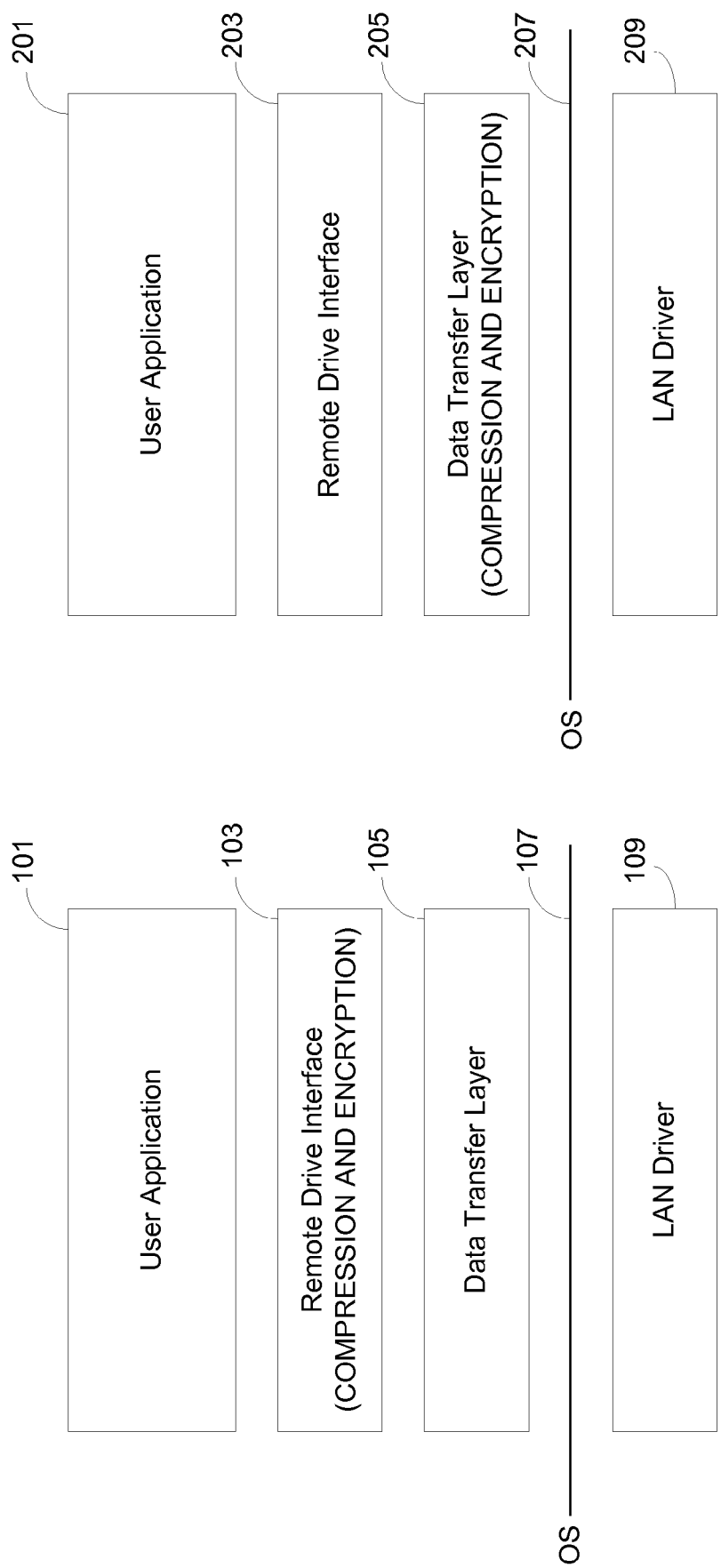

SECURE BLOCK READ AND WRITE PROTOCOL FOR REMOTELY STORED FILES

BACKGROUND OF THE INVENTION

1. Field of Invention

The invention relates to remote file operations, particularly to secure remote file operations, and more particularly to doing the operations at block level.

2. Description of the Related Art

Today's business environment often requires the need for reviewing and editing documents from remote locations. Having access to networking technologies, like the Internet, allows the user to remotely access, via laptops, PDAs, etc., documents securely stored at a central location. For example, a user may create a document at work, save it on an online file depository, and access the same file later at home. In another example, the user may create a presentation document, upload it to the online file depository, and allow access to the same file to colleagues around the world.

Uploading and retrieving user files to and from an online file server is typically carried out using a client-server architecture. FIG. 1 shows a client side network stack 100 employed by typical prior art file transfer programs. The network stack includes a User Application 101, a Remote Drive Interface 103, a Data Transfer layer 105, and a LAN Driver 109. The horizontal line 107 labeled "OS" indicates that the layers below the line are implemented within the operating system (OS) kernel. Although not shown in FIG. 1, it is implied that the client side network stack communicates with a server, which includes remote file storage. The user application 101 communicates with the remote drive interface layer 103 to request or store files. The remote drive interface layer 103 may offer additional primitives such as select remote drive, rename file, select compression algorithm, select encryption algorithm, etc. The remote drive interface layer 103, in turn, communicates with the data transfer layer 105, which offers primitives such as "get," "put," etc. The data transfer layer may implement the primitives with a transfer protocol, such as file transfer protocol (FTP), simple file transfer protocol (SFTP), etc. Finally, the LAN driver is used to transmit or receive the data payload requested by various higher level operations.

For various reasons, some of which are discussed below, these operations have been limited to treating the files as a whole. For example, if a file stored on the server needs to be appended, the user will have to upload the complete file, append the new data, to replace the version stored on the server. In general, the data transfer layer 105 of FIG. 1, does not allow uploading only portions of the files that need updating or downloading only selected portions; instead the whole updated file needs to be uploaded or downloaded. For a given bandwidth, the amount of time taken to upload a file to the server is primarily dictated by the file size. In situations where file sizes are very large, transferring the whole file each time, for even a small modification, may prove to be quite inefficient. Further, the protocols associated with the data transfer layer 105 transfer files sequentially. Consequently, for this reason as well, transferring large files results in large delays.

To reduce large temporal costs associated with large file transfers, many applications compress the file before being transferred. For example, in FIG. 1, the remote drive interface layer 103 compresses the file before it is transferred to the data transfer layer 105. Lossless file compression algorithms are usually based on two popular methods: minimum redundancy coding (e.g., Huffman coding) and dictionary based method (e.g., Lempel-Ziv). By its very nature, compression substitutes a shorter (measured in bits) representation (or code) of a symbol for a relatively longer representation of the same symbol in the original file. For example, an 8-bit representation of the letter 'E' in the original file may be replaced by a 3-bit unique code in the compressed file. Note that the uniqueness of an encoding of a symbol is limited to the same file or dataset. In other words, a letter 'E' in one file may be encoded with an entirely different code and code-length than that for the letter 'E' in a second file (for example, the Huffman coding encodes each symbol based on that symbols frequency in the file or dataset). As a result, the offset from the start of file to the code for a symbol in the compressed file may be different from that for the same symbol in the original file. In other words, the block list mapping from the original file to the compressed file cannot be determined a priori. This makes it very difficult to merely update a block of data in a file which is stored compressed or retrieve a selected block from the stored compressed file.

Therefore, a solution is needed that enables overwriting or retrieving any section of an existing file on the remote file server while being efficient and cost effective.

SUMMARY OF THE INVENTION

Disclosed herein are file transfer systems, methods, and devises that address the foregoing deficiencies. In particular, the present invention provides uploading only those portions of the file that have been modified or downloading only desired portions. Moreover, the present invention provides uploading parts of a file before the whole file has been specified on the client side.

In the preferred embodiment, the encryption and compression capabilities in the prior art client remote drive interface layer are moved to a data transfer layer. The client remote drive interface layer still interacts with user applications, but it now utilizes block requests as well as file requests when cooperating with the user applications. These requirements, and any related data, are transferred to the data transfer layer. This data transfer layer now handles encryption and compression operations, at the level requested, either block or file, so that the file transfers are still secure and can be short.

At the server end a data transfer layer is provided that performs the matching decryption and decompression so that the block or file is recovered in its original state at the server. In the preferred embodiment, optionally, the server re-encrypts the data prior to storage. As only encryption is performed and not compression, the block sizes remain unchanged. Thus, the blocks stored on the server match the raw blocks utilized by the user application, though they are preferably encrypted for security. Of course the reverse operations occur on block and file reads.

By using encrypted and compressed file transfers, the communications are efficient and secure. By storing only encrypted but not compressed data on the server, block sizes between data in the user application and stored on the server are maintained, allowing direct access of selected blocks for overwriting, appending, modifying, or reading as desired.

BRIEF DESCRIPTION OF THE DRAWINGS

Exemplary embodiments of the present invention will be more readily understood from reading the following description and by reference to the accompanying drawing, in which:

FIG. 1 shows a network stack of the client system according to the prior art.

FIG. 2 shows a network stack of a client system in accordance with an embodiment of the present invention.

DETAILED DESCRIPTION

Figure 3:
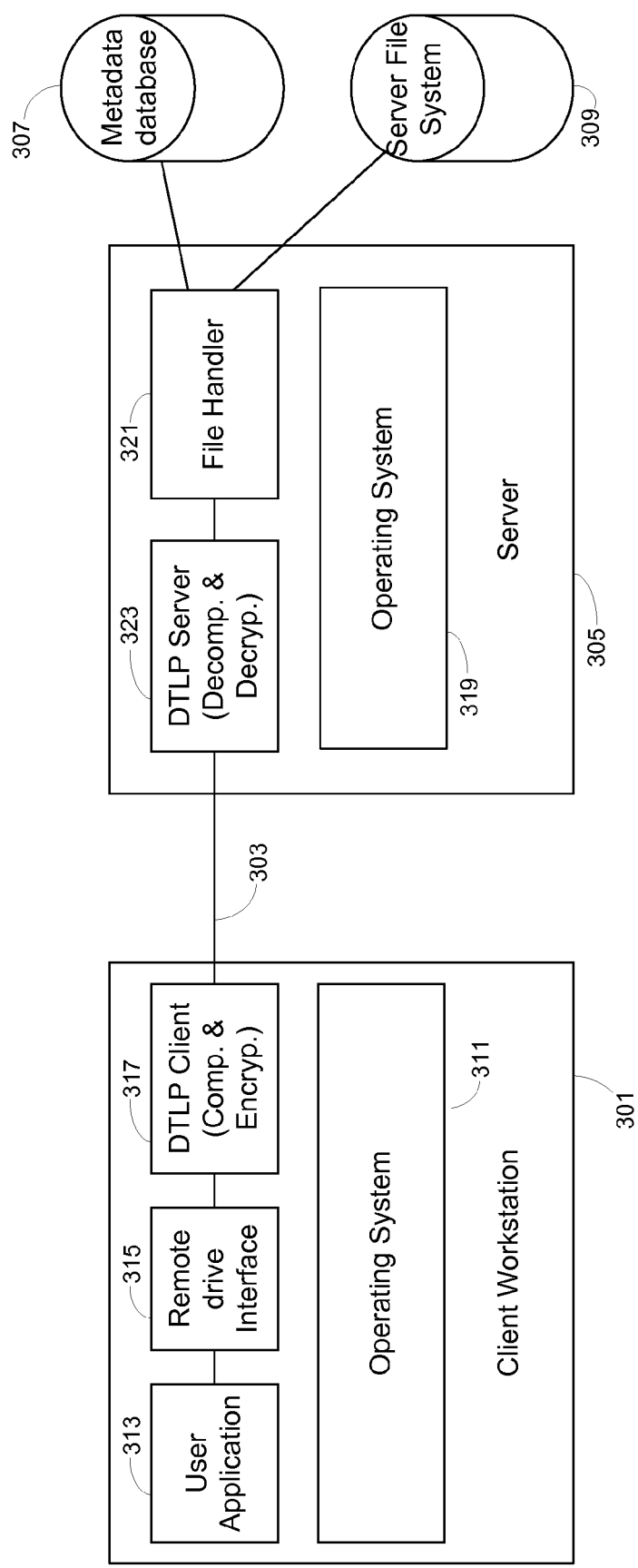
FIG. 3 illustrates a block diagram of a client system connected to a server in accordance with an embodiment of the present invention.

FIG. 2 illustrates the client side network architecture 200 of the preferred embodiment. The network stack includes a user application 201, a remote drive interface 203, a data transfer layer 205 and a LAN Driver 209. The horizontal line labeled "OS" indicates that the layers below the line, e.g., the LAN Driver layer 209, are implemented within the operating system (OS) kernel. Note that the OS line 207 may be placed at the interface between any two layers. However, the embodiment shown does not preclude the layers from being implemented in the hardware, e.g., within the network interface card. Also note that the lower network layers (e.g., the physical layer) have not been shown for simplicity. Although not shown in FIG. 2, it is implied that the client side network stack 200 communicates with a server that includes remote file storage.

The remote drive interface 203 of the embodiment shown in FIG. 2 offers block level file operations to the user application layer 201. For example, the remote drive interface now offers operations on blocks of data within a file, in addition to operations that act on whole files. For example, the user application 201 may request the remote drive interface 203 to modify only a certain portion of the file stored at the server by sending block level file commands to the remote drive interface 203. Further, the user application 201 may request that only a certain block of data be read from the file stored at the server. The Remote Drive Interface 203 relies on the operations provided by the data transfer layer 205. The data transfer layer 205 offers all the primitives that the remote drive interface needs to carry out block size file operations. For example, the data transfer layer 205 may offer primitives such as "get block(filename, offset, size)," where the arguments filename, denotes the name and location of the file; offset denotes the number of bytes from the start of file; and size denotes the size of the block been requested. Of course, depending upon the requirements of the remote drive interface 203, the operations offered by the data transfer layer 205 and the arguments associated with those operations my be modified accordingly.

A data transfer layer protocol (DTLP) is typically employed for communication between the data transfer layer 205 on the client side and the data transfer layer on the server side. The data transfer layer 205 shown in FIG. 2 is capable of compressing and encrypting the data being transferred. Data is transferred in the raw form (uncompressed and unencrypted) from the remote drive interface 203 to the data transfer layer 205. The DTLP client compresses and encrypts the data, block by block, and transmits the processed blocks of data to the DTLP server. The DTLP server decrypts and decompresses each data block before carrying out any server side operations. In the preferred embodiment the data blocks are encrypted again for storage into the database. It is understood that the data block can also be stored unencrypted, but the use of encrypted storage is relatively more secure.

The DTLP may use any lossless compression methodology well known in the art, e.g., minimum redundancy coding like Huffman coding, dictionary based methods like LZ-77, prediction by partial matching (PPM), dynamic markov compression, etc. DTLP may employ various encryption algorithms well known in the art, e.g., symmetric key ciphers such as advanced encryption standard (AES), data encryption standard (DES), etc.; asymmetric key ciphers such as RSA, elliptic curve encryption, etc.

FIG. 3 shows the block diagram of a client workstation 301 connected by a network 303, such as the Internet, to a server 305, which in turn is connected to a metadata database 307 and a server file system 309. The client workstation 301 includes an operating system 311, a user application 313, a remote drive interface 315, and a DTLP client 317. The server 305 includes an operating system 319, a file handler 321, and a DTLP server 323. The remote drive interface 315 is in communication with the file handler 321 via the DTLP protocol. The remote drive interface 315 interacts with the client operating system 311 and parses a data file into metadata and binary file data. The metadata may be, for example, in extensible markup language (XML). A DTLP client 317 is invoked at the client workstation to communicate with the DTLP server 323 listening at the server 305. The file handler 321 communicates with the DTLP server 323 and also communicates with the metadata database 307 and the server file system 309 to carry out operations requested by the user application 313. Either the DTLP server 323 or the file handler 321 can re-encrypt data files before they are stored in the server file system 309 if encrypted storage is desired. This is a simplified illustration for descriptive purposes. It is understood that the client workstation 301, the server 305, the metadata database 307, and the server file system 309 may be configured in many different arrangements and can be replicated as desired. In addition, it is understood that multiple client workstations 301 will be connected to a single server 305.

The server 305 does not include a conventional file system. Rather, a database, such as a SQL database, is provided for storing metadata, while the file data itself is stored in the server file system, which can be any system capable of allowing the files to be accessed in blocks. A virtual file system (VFS) is provided (not shown) wherein the remotely stored data appears as it is locally stored data in the client's file system. Metadata generally includes information related to the data file. For example, the metadata may include data regarding data elements or attributes (e.g., name, size, data type, etc.), records or data structures (e.g., length, fields, columns, etc.), and file data (e.g., location, associations, ownership, date modified, date created, etc.). Metadata may include descriptive information about the context, quality and condition, or characteristics of the file data. Various other metadata attributes and structures may be defined in XML. Values are present in both the metadata of the file and the data of the file to act as indices into the metadata database 307 and the server file system 309 to allow the metadata and the data portions to be correlated. The transfer of metadata and file data is typically carried out separately.

Because the DTLP client 317 compresses the data file blocks before transmitting them to the DTLP server 323, the time taken to transfer large data files is smaller than the time taken for a file transfer protocol that does not perform compression. The encryption operation by the data transfer layer ensures confidentiality and integrity of the data being transferred.

If the data is stored in the 309 in unencrypted form, then both the remote drive interface 315 and the file handler 321 see the data file in its raw form, so that the block list mapping between the file on the client workstation 301 and the same file on the server 305 (or subsequently in the 309) is congruent. If the data is stored in the 309 in encrypted form, the block list mapping is still congruent because encryption does not change the block size. The offset of a data block in the data file on the client workstation 301 is equal (or has a known relationship) to the offset of the same block in the transferred data file on the server 305. For example, if a data file on the client workstation 301 is modified, and the offsets of the modified bytes are known, only the modified bytes and their offsets may be transferred to the server 305. As a result, any data block in the file on the server 305 may be modified.

Similarly, a block of data may be read from a file stored in the 309. If the offset and the size of the data block is known, then the remote drive interface 315 may request the file handler 321, via the DTLP client 317 and DTLP server 323, to retrieve the requested data block only. If the data block has been stored in encrypted form in the 309, then the file handler 321 (or optionally, the DTLP server 323) decrypts the data block to revert it back to raw form. The DTLP server 323 then compresses and encrypts the requested data block and transmits the compressed and encrypted data block to the DTLP client 317. The DTLP client 317 decrypts and decompresses the received data block such that the data block is transformed back to its raw form before being transferred to the remote drive interface 315. The remote drive interface 315 subsequently transfers the data block requested to be read by the user application 313. Of course, in cases where the user application requests the whole file, the above described operations are carried out on the requested file as a whole.

The example shown in FIG. 3 also provides with the capability of transferring data files from the client workstation 301 even before the data files have been completely specified on the client workstation 301. For example, suppose that a new file is being created that needs to be transferred from the client workstation 301 to the file database 309. Also assume that the new file is being created by sequentially adding bytes until it reaches its specified size, though additions can be done out of sequence as well. Therefore, at any time after the first byte is written and before the file reaches its final size, there is data that can potentially be transferred to the server 305 while the rest of the file is being written. In the case of large files, the above capability results in considerable reduction in data file transfer.

In the embodiments described above, it is understood that the order of compression and encryption at the data transfer layer protocol server may be reversed. In other words, the DTLP client 317 may first encrypt and then compress the data blocks before transmitting the data blocks to the server. Consequently, the order of decompression and decryption at the DTLP server 323 may be ordered accordingly.

The following briefly describes the file locking mechanism in prior art DTLP with reference to FIG. 3. The application 313 performs typical file operations such as open, read, write, close, etc. The remote drive interface 315 provides lock and unlock requests to the server 305 when a write lock or a read with intent to write lock is required. The server 305 places the lock ownership associated with the particular request with the metadata database 307. The application 313 then sends a write request to the server 305 via the remote drive interface 315. The server 305 verifies if the write request is associated with the previous lock request. On the subsequent write data operation, the lock is escalated and the file handler 321 finalizes the write resulting in the data being written to the 309. After the data is written, the lock is reduced back to read with intent to write until eventually the application 313 requests to close and release the lock. Note that once an escalated lock is acquired, all other requests to read or write to the locked (intermediate) file are rejected. More details of the locking mechanisms are disclosed in commonly assigned U.S. patent applications U.S. Ser. No. 11/609,206, entitled "File operations with multiple level file locking techniques," by Chad Fredrick Jones, et al., and U.S. Ser. No. 11/609,213 entitled "File operations with persistent file locking techniques," by John T. White, Jr., and are hereby incorporated by reference.

To allow a file to be written in the manner described in the preferred embodiment, i.e., in small portions, the intermediate file should be allowed to accept writes while it has been locked. As described above, the prior art does not allow any writes to an intermediate file. Writes are allowed only after the intermediate file has been finalized and the associated lock has been released by the application. Even after the lock is reacquired by a new write operation that writes a subsequent data block to the intermediate file, the prior art protocol results in the new write operation overwriting the existing file data instead of appending the existing file data with new data. Therefore, the DTLP described in prior art does not support the now desired capability of writing only portions of file data. In the DTLP described herein, the aforementioned capabilities are achieved by adding addition features to the existing DTLP.

For example, an additional flag (FLAG_MODIFY) is added on write request that indicates that the existing file is to be modified and not overwritten. If a lock is held on the file being modified in the metadata database 307, and a corresponding intermediate file exists, then the write request is considered to be a continuation of the previous received write request. This allows multiple writes to the same intermediate file.

To allow writing data to a file at a particular offset, fields are provided in the write request data structure that indicates the offset (FIELD_OFFSET) and the size (FIELD_BLOCKSIZE) of the data block. The offset is typically the same as the offset on the raw file stored on the client workstation 301. The size of data block may be specified in bytes.

A set-size flag (FLAG_SETSIZE) is included in the write request to indicate whether the file size is being altered. Two additional fields specifying new original size (FIELD_NEW-ORIGINAL-SIZE) and new raw file size (FIELD_NEW-RAW-SIZE) are also included. If the current raw file size is smaller than specified, then the new size is extended prior to file upload. If the current raw file size is larger than the one requested, then the file is truncated to the new size prior to file upload request.

As mentioned above, the data write is not finalized unless the data write is associated with the last write request. A flag (FLAG_NO-FINALIZE) is included in the write request that indicates that the file should not be finalized after at the end of the transfer.

Once the file transfer is complete, a flag (FLAG_LOCK-RELEASE) on the write request indicates that the transfer has ended and that the lock may now be released.

The aforementioned additions to the write request data structure are usually specified in the same write request to achieve the desired file transfer operation. For example, to append an existing file, FLAG_MODIFY is set, FIELD_OFFSET is set at the end of file, FIELD_BLOCKSIZE is set to the size of the data to be appended, FLAG_SETSIZE is set, and FIELD_NEW-RAW-SIZE is appropriately specified.

As compared to the embodiment shown in FIG. 1, the preferred embodiment of the present invention (as shown in FIG. 2 and FIG. 3) utilizes more server 305 processing bandwidth as a result of performing the various encryption, decryption, and compression operations. Further, slightly more space is used by the 309 as the data is stored uncompressed. Given the overall large performance improvements provided by performing block level file operations and starting write operations before the file is specified, the additional server processing cost and database cost are considered a very satisfactory tradeoff, particularly when it is understood that processing power is increasing rapidly and data storage costs are decreasing rapidly.

The embodiments described herein, allow uploading only those portions of the file that have been modified or downloading only the requested portions of the file stored in remote file storage. The user application communicates with a remote drive interface to request or store file data. The remote drive interface sends block level commands and block data to the data transfer layer protocol client, which, in turn, compresses and encrypts the data blocks and transmits them to the data transfer layer protocol server on the sever workstation. The data transfer layer protocol server decrypts and decompresses the received data blocks and provides them to the file handler. The file handler stores the data blocks at the appropriate location on the.

When retrieving data from the above operations are reversed. Carrying out the compression and encryption operations at the data transfer layer ensures that the block list mapping relationship between the file at the client side and the version of the same file on the server side is congruent. Further, for confidentiality and integrity of the stored data, the data blocks may be encrypted by the file handler or the data transfer layer protocol server before being stored on the.

The embodiments disclosed herein provide additional features to the write request data structure to allow data blocks to be written to the same file while the file is locked at the server. Further, improved write request data structure ensures that the file being uploaded to is not finalized until the last data block has been stored in the.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for secure remote file storage, the system comprising:
   a client workstation including:
      an operating system;
      a user application;
      a remote drive interface coupled to said user application; and
      a data transfer layer protocol client coupled to said remote drive interface and for coupling to a server over a network, and
   a server including:
      an operating system;
      a server file system;
      a data transfer layer protocol server for coupling to a client workstation over a network; and
      a file handler coupled to said data transfer layer protocol server and to said server file system,
   wherein said remote drive interface receives block level file commands and unencrypted and uncompressed data blocks of a file from said user application and provides block commands and data blocks to said data transfer layer protocol client, wherein said data transfer layer protocol client compresses and encrypts each block of data received from said remote drive interface for transmission to said server and decrypts and decompresses blocks received from said data transfer layer protocol server and provides the unencrypted and uncompressed data to said remote drive interface,
   wherein said data transfer layer protocol server receives the encrypted and compressed data blocks from said data transfer layer protocol client and decrypts and decompresses said data blocks for storage in said server file system and provides said data blocks to said file handler for storage in said server file system and compresses and encrypts data blocks retrieved from said server file system by said file handler for transmission to said client workstation,
   wherein said data blocks are less than the full size of the file; and
   wherein one of said data transfer layer protocol server and said file handler encrypt data blocks for storage in said server file system after said data blocks are decrypted and decompressed and one of said data transfer layer protocol server and file handler decrypt data blocks received from said server file system to be provided to said data transfer layer protocol server for encryption and compression.

2. A method for transferring data blocks between a user application running on a client workstation and a server file system comprising the steps of:
   generating block level file commands for transferring data blocks of a file between a user application running on the client workstation and a server file system coupled to a server;
   operating a remote file interface layer for receiving block level file commands and block data from the user application and providing corresponding block level commands to a data transfer layer protocol client, and receiving data blocks from the data transfer layer protocol client and transferring the received data blocks to the user application;
   operating the data transfer layer protocol client for receiving block level file commands from the remote drive interface layer and coupled to a data transfer layer protocol server via a network, wherein operating the data transfer layer protocol client comprises the steps of:
      compressing and encrypting the data blocks received from the remote drive interface layer; and
      transmitting the block level file commands and the compressed and encrypted data blocks to the data transfer layer server when uploading data blocks;
      decrypting and decompressing data blocks received from the data transfer layer protocol server; and
      transferring the decrypted and decompressed data blocks to the remote drive interface when retrieving data blocks,
   wherein said data blocks are less than the full size of the file; and
   wherein one of said data transfer layer protocol server and said file handler encrypt data blocks for storage in said server file system after said data blocks are decrypted and decompressed and one of said data transfer layer protocol server and file handler decrypt data blocks received from said server file system to be provided to said data transfer layer protocol server for encryption and compression.

3. A method for transferring data blocks between a remote data file database and a client workstation comprising the steps of:
   operating a file handler, coupled to the server file system and responsive to a data transfer layer protocol server for storing and retrieving data blocks of a file to and from the server file system based on the block level file commands received from the data transfer layer protocol server; and operating the data transfer layer protocol server coupled to a data transfer layer protocol client, running on the client workstation, via a network for receiving block level file commands from the data transfer layer protocol client, wherein operating the data transfer layer protocol server comprises the steps of:

decrypting and decompressing the data blocks received from the data transfer layer protocol client and providing the decrypted and decompressed data blocks to the file handler when uploading data; and compressing and encrypting data blocks received from the file handler and transmitting the compressed and encrypted data blocks to the data transfer layer protocol client when retrieving data, wherein said data blocks are less than the full size of the file; and wherein one of said data transfer layer protocol server and said file handler encrypt data blocks for storage in said server file system after said data blocks are decrypted and decompressed and one of said data transfer layer protocol server and file handler decrypt data blocks received from said server file system to be provided to said data transfer layer protocol server for encryption and compression.

4. The method of claim 3, wherein the operating a file handler further comprises encrypting the data blocks before uploading to the server file system and decrypting the data blocks that have been stored in encrypted from.

5. A server workstation for secure remote file storage comprising:

at least one processor;

an operating system;

a server file system;

a data transfer layer protocol server for coupling to a client workstation over a network; and a file handler coupled to the data transfer layer protocol server and the server file system, wherein the data transfer layer protocol server receives encrypted and compressed data blocks of a file and block level file commands from the client and decrypts and decompresses the data blocks for storage in the server file system and provides the data blocks to the file handler for storage, wherein the data transfer layer protocol server compresses and encrypts data blocks received from the file handler and transmits the compressed and encrypted data blocks to the client, and wherein said data blocks are less than the full size of the file; and wherein the data blocks are encrypted by one of the data transfer layer protocol server and the file handler before being stored in the server file system, and wherein one of the data transfer layer protocol server and file handler decrypts the data blocks that have been stored in encrypted form upon retrieving the encrypted data blocks from the server file system.

* * * * *